US012737096B2

(12) United States Patent
Misiaszek et al.

(10) Patent No.: US 12,737,096 B2
(45) **Date of Patent: *Sep. 15, 2026**

(54) DRAWER PAGE OVERLAY FOR MULTITASKING

(71) Applicant: Truist Bank, Charlotte, NC (US)

(72) Inventors: Alexandra Heath Misiaszek, Cornelius, NC (US); LaTonja Barlow, Lenexa, KS (US)

(73) Assignee: TRUIST BANK, Charlotte, NC (US)

(*) Notice: Subject to any disclaimer, the term of this patent is extended or adjusted under 35 U.S.C. 154(b) by 163 days.

This patent is subject to a terminal disclaimer.

(21) Appl. No.: 18/670,069

(22) Filed: May 21, 2024

(65) Prior Publication Data

US 2024/0302944 A1 Sep. 12, 2024

Related U.S. Application Data

(63) Continuation of application No. 17/896,466, filed on Aug. 26, 2022, now Pat. No. 12,019,851.

(51) Int. Cl.

*G06F 3/0483* (2013.01)
*G06F 3/0482* (2013.01)
*G06F 3/04845* (2022.01)

(52) U.S. Cl.

CPC .......... *G06F 3/0483* (2013.01); *G06F 3/0482* (2013.01); *G06F 3/04845* (2013.01)

(58) Field of Classification Search

CPC .... G06F 3/0482; G06F 3/0483; G06F 3/0481; G06F 3/04845; G06F 3/0484
USPC .................................................. 715/764, 723
See application file for complete search history.

(56) References Cited

U.S. PATENT DOCUMENTS

| | | | | |
|---|---|---|---|---|
| 11,099,731 B1 * | 8/2021 | Everette | G06F 3/0488 | |
| 2007/0106955 A1 * | 5/2007 | Conrad | G06F 3/0481 | 715/781 |
| 2008/0022229 A1 * | 1/2008 | Bhumkar | G06F 16/9038 | 707/E17.119 |
| 2012/0029661 A1 * | 2/2012 | Jones | G05B 19/41865 | 700/17 |
| 2012/0084697 A1 * | 4/2012 | Reeves | G06F 3/04886 | 715/863 |
| 2013/0061151 A1 * | 3/2013 | Perry | G06F 3/0482 | 715/744 |
| 2013/0097498 A1 * | 4/2013 | Steinberg | G06F 3/04895 | 715/708 |
| 2013/0283168 A1 * | 10/2013 | Brown | G06F 3/165 | 715/728 |
| 2014/0280180 A1 * | 9/2014 | Edecker | G06F 16/285 | 707/769 |

(Continued)

*Primary Examiner* — Hwei-Min Lu

(74) *Attorney, Agent, or Firm* — Michael A. Springs, Esq.; Shumaker, Loop & Kendrick, LLP; Patrick B. Horne

(57) ABSTRACT

A method includes generating a static page of a graphical user interface. The method also includes receiving a selection of a graphical object by a user to display a drawer page and generating the drawer page. The drawer page is overlaid on the portion of the static page. The drawer page includes a drawer bar that is interactable by the user to adjust a drawer page size and a static page size based on a position of the drawer bar. Additionally, the method includes displaying the static page and the drawer page of the graphical user interface. Upon display, the drawer bar is positioned at a default position based on historical data associated with the drawer bar.

20 Claims, 4 Drawing Sheets

(56) References Cited

U.S. PATENT DOCUMENTS

| | | | | |
|---|---|---|---|---|
| 2015/0088740 | A1* | 3/2015 | Doyle | G06Q 40/00<br>705/42 |
| 2015/0324068 | A1* | 11/2015 | Bellare | G06F 3/04886<br>715/777 |
| 2016/0275582 | A1* | 9/2016 | Zuverink | G06F 3/04842 |
| 2018/0188900 | A1* | 7/2018 | Gupta | G09G 5/32 |
| 2019/0012391 | A1* | 1/2019 | Eriksson | G06F 16/9535 |
| 2019/0104216 | A1* | 4/2019 | Van Hecke | G06F 3/04817 |
| 2020/0233572 | A1* | 7/2020 | Healy | G06F 3/0416 |
| 2021/0072884 | A1* | 3/2021 | Uchiumi | G06F 3/0486 |

* cited by examiner

DRAWER PAGE OVERLAY FOR MULTITASKING

CROSS-REFERENCE TO RELATED APPLICATIONS

This application is a continuation of U.S. patent application Ser. No. 17/896,466, filed Aug. 26, 2022, titled "DRAWER PAGE OVERLAY FOR MULTITASKING", the entirety of which is incorporated herein by reference for all purposes.

TECHNICAL FIELD

The present disclosure relates to graphical user interfaces and, more particularly (although not necessarily exclusively), to a graphical user interface that includes a drawer page overlay for multitasking.

BACKGROUND

In some cases, a graphical user interface can be displayed to a user to relay to the user information relevant to the particular user. The graphical user interface can be interactive. For instance, the graphical user interface can display data and objects that can relate to functions associated with a user account. In some cases, the graphical user interface can be generated through multiple windows, where each window displays data or objects associated with the window. By displaying the graphical user interface across multiple windows, a user may constantly transition between windows to ingest or interact with features of the various windows. In some examples, the transition between the windows may result in inefficiencies associated with the transition and potential for losing information or progress with particular transactions during the transitions.

SUMMARY

In one example, a system can include a processor and a memory including program code that is executable by the processor for causing the processor to perform operations. The operations include generating a static page of a graphical user interface. The operations also include receiving a selection of a graphical object and generating the drawer page of the graphical user interface. The drawer page is overlaid on at least the portion of the static page. Additionally, the drawer page includes a drawer bar that is interactable by the user to adjust a drawer page size of the drawer page and a static page size of the static page based on a position of the drawer bar. Further, the operations include displaying the static page and the drawer page of the graphical user interface. Upon display, the drawer bar is positioned at a default position based on historical data associated with the drawer bar.

In an additional example, a computer-implemented method includes generating a static page of a graphical user interface. The method also includes receiving a selection of a graphical object and generating the drawer page of the graphical user interface. The drawer page is overlaid on at least the portion of the static page. Additionally, the drawer page includes a drawer bar that is interactable by the user to adjust a drawer page size of the drawer page and a static page size of the static page based on a position of the drawer bar. Additionally, the method includes displaying the static page and the drawer page of the graphical user interface. Upon display, the drawer bar is positioned at a default position based on historical data associated with the drawer bar.

In an additional example, a non-transitory computer-readable medium includes program code that is executable by a processor for causing the processor to perform operations. The operations include generating a static page of a graphical user interface. The operations also include receiving a selection of a graphical object and generating the drawer page of the graphical user interface. The drawer page is overlaid on at least the portion of the static page. Additionally, the drawer page includes a drawer bar that is interactable by the user to adjust a drawer page size of the drawer page and a static page size of the static page based on a position of the drawer bar. Further, the operations include displaying the static page and the drawer page of the graphical user interface. Upon display, the drawer bar is positioned at a default position based on historical data associated with the drawer bar.

DETAILED DESCRIPTION

Figure 1:
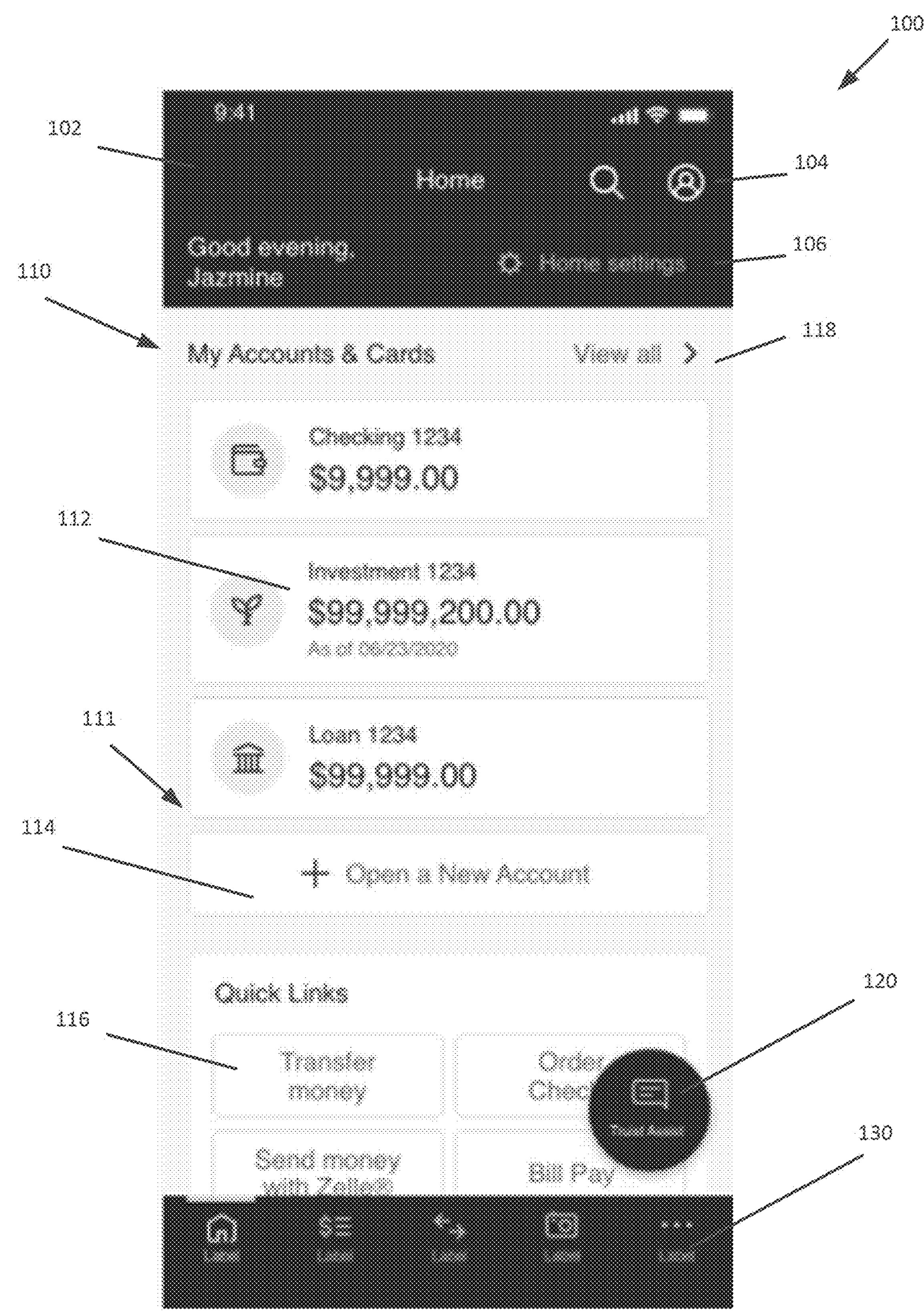
FIG. 1 is a graphical user interface with a graphical object that is selectable to generate a drawer page overlay for multitasking, according to one example of the present disclosure.

Certain aspects and features relate to a graphical user interface that includes a drawer page overlay for multitasking. The graphical user interface can provide a user with access to account data and account functions associated with a user account. A computing device can generate the graphical user interface. The graphical user interface can be displayed on a user device, such as a personal computer or a mobile device. In some examples, the user device can be the same as the computing device. In some examples, the graphical user interface can include a static page. In some examples, the static page can be fixed in size. The drawer page overlay can include a drawer bar. A user can interact with the drawer bar to adjust the size of the static page and the drawer page. The computing device can adjust the default position of the drawer bar based on historical data associated with the drawer bar.

The static page can depict a first set of interactive elements. In some examples, the first set of interactive elements can include a set of resource shortcuts. In some examples, the resource shortcuts can be chips. The term "chips" may refer to a compact element that is displayable in the graphical user interface that enables a user to enter information, select a choice, filter content, or trigger an action. The resource shortcuts can be displayed as clickable boxes. Each resource shortcut can be associated with a respective account function. For example, the user can interact with the interactive element corresponding to the resource shortcut to issue a command to call the account function associated with the resource shortcut. The resource shortcut can include a hyperlink. The static page can also depict one or more account boxes. Each account box can correspond to an account. Each account box can display account data associated with the account. For example, the account box can display an amount associated with the account, a name associated with the account, a serial number associated with the account, or any other suitable information associated with the account. The accounts can be associated with the user account. In some examples, the account boxes can be interacted with by the user to display additional information relating to the account.

The static page can include a graphical object that can be interacted with by the user. The graphical object can be displayed as 'hovering' over elements of the static page. For example, the user may be able to scroll through the static page without adjusting the relative position of the graphical object. The graphical object can be, for example, a shape with a logo or icon inscribed within it. The user can interact with the graphical object to generate a drawer page.

The drawer page can be sized to cover a first portion of the static page, while leaving a second portion of the static page visible to the user. The drawer page can include a second set of interactive elements and a drawer bar. The user can interact with the second set of interactive elements to engage in correspondence with a virtual assistant or a live agent. For example, the drawer page can include a message box that can receive input from the user and a message bubble that can display an output to the user. For example, the user can interact with the message box to display a keyboard with which the user can type a message. In some examples, the user can interact with a 'send' button to transmit the message to the virtual assistant or the live agent. In other examples, interacting with the graphical object can cause the computing device to issue a command to turn on a microphone to record speech from the user as input. For example, the computing device can include audio processing software that can convert the recorded speech into a message from the user.

The user can select the drawer bar to adjust its position. Adjusting the position of the drawer bar can cause the relative sizes of the drawer page and the static page to change. For example, the user can translate the drawer bar in a first direction to increase the size of the drawer page and decrease the size of the static page. Conversely, the user can translate the drawer bar in a second direction to decrease the size of the drawer page and increase the size of the static page. In some examples, the user can select the drawer bar to hide the drawer page.

The virtual assistant can receive the message from the user and generate an output based on the message. In some examples, the virtual assistant can include a machine learning algorithm for generating responses to the user input. The virtual assistant can also include natural language processing software for interpreting input from the user. In some examples, the virtual assistant can enable the user to engage in correspondence with the live agent. For example, the virtual assistant can introduce the live agent in response to certain user inputs. In some examples, the virtual assistant can include an option to resume a previous conversation.

In some examples, the drawer page can include one or more message bubbles to display the output from the virtual assistant or the live agent. In some examples, the message bubbles can be accompanied by option bubbles. The user can interact with the option bubbles to transmit a predetermined input to the virtual assistant or live agent. Interacting with the graphical user interface to correspond with the virtual assistant or live agent can enable the user to access account functions or account data that may otherwise be difficult to access.

In some examples, the drawer page can include a drawer bar. For example, the drawer bar can be positioned at the top of the drawer page. The user can interact with the drawer bar to re-size the drawer page. For example, the user can use the drawer bar to increase the size of a first portion of a screen occupied by the drawer page and decrease the size of a second portion of the screen occupied by the static page. Additionally or alternatively, the user can use the drawer bar to decrease the size of the first portion of the screen occupied by the drawer page and increase the size of the second portion of the screen occupied by the static page. Adjusting the drawer page can enable the user to view desired portions of the graphical user interface simultaneously. In some examples, the drawer bar can be interacted with by the user for an extended period of time to render the drawer page partially transparent to view covered portions of the static page. For example, the user can tap and hold the drawer bar to render the drawer page partially transparent.

Enabling the user to view the first set of interactive elements on the static page and the second set of interactive elements on the drawer page can enable the user to multi-task. For example, while engaging in correspondence with the virtual assistant or live agent, the user can view account data and access account functions associated with the interactive elements on the static page. Enabling the user to multi-task can reduce a consumption of computing resources associated with executing the graphical user interface and can decrease an amount of time spent using the graphical user interface. Enabling the user to multitask can also minimize an amount of network traffic that would otherwise be associated with transferring the user back-and-forth between various pages.

In the following description, for the purposes of explanation, specific details are set forth to provide a thorough understanding of various implementations and examples. Various implementations can be practiced without these specific details. The figures and description are not intended to be restrictive.

FIG. 1 is a graphical user interface with a graphical object that is selectable to generate a drawer page overlay for multitasking. In some examples, the graphical user interface 100 can be displayed on a user device. The graphical user interface 100 can include a static page 110. In some examples, a home page 102 of the static page can depict a first set of interactive elements 111. In some examples, the first set of interactive elements 111 can include a set of resource shortcuts 116. The resource shortcuts 116 can be displayed as clickable boxes. Each resource shortcut 116 can be associated with a respective account function. For example, the user can interact with the interactive element corresponding to the resource shortcut 116 to issue a command to call the account function associated with the resource shortcut 116. In some examples, the resource shortcut 116 can include a hyperlink. The static page can also depict one or more account boxes 112. Each account box 112 can correspond to an account. Each account box 112 can display account data associated with the account. For example, the account box 112 can display an amount associated with the account, a name associated with the account, a serial number associated with the account, or any other suitable information associated with the account. The accounts can be associated with the user account. In some examples, the account boxes 112 can be interacted with by the user to display additional information relating to the account. In an example, the interactive elements may include a new account element 114. A user may interact with the new account element 114 to initiate a process for opening a new account associated with the user.

The static page 110 can include one or more icons 104. The user can interact with each icon 104 to execute a function associated with the user account. In some examples, an icon 104 can enable the user to initiate a search. In some examples, an icon 104 can cause the graphical user interface 100 to display profile settings associated with the user account. Furthermore, the static page 110 can include a settings tab 106. The user can use the settings tab 106 to adjust settings associated with the user account. The static page 110 can also include a user interaction bar 130 that provides a mechanism for the user to transition between various functions of the home page 102.

The static page 110 can include a graphical object 120 that can be interacted with by the user. The graphical object 120 can be displayed as 'hovering' over elements of the static page 110. For example, the user may be able to scroll through the static page 110 without adjusting the relative position of the graphical object 120. The graphical object 120 can be, for example, a shape with a logo or icon inscribed within it. The user can interact with the graphical object 120 to generate a drawer page, as discussed below with respect to FIG. 2.

Figure 2:
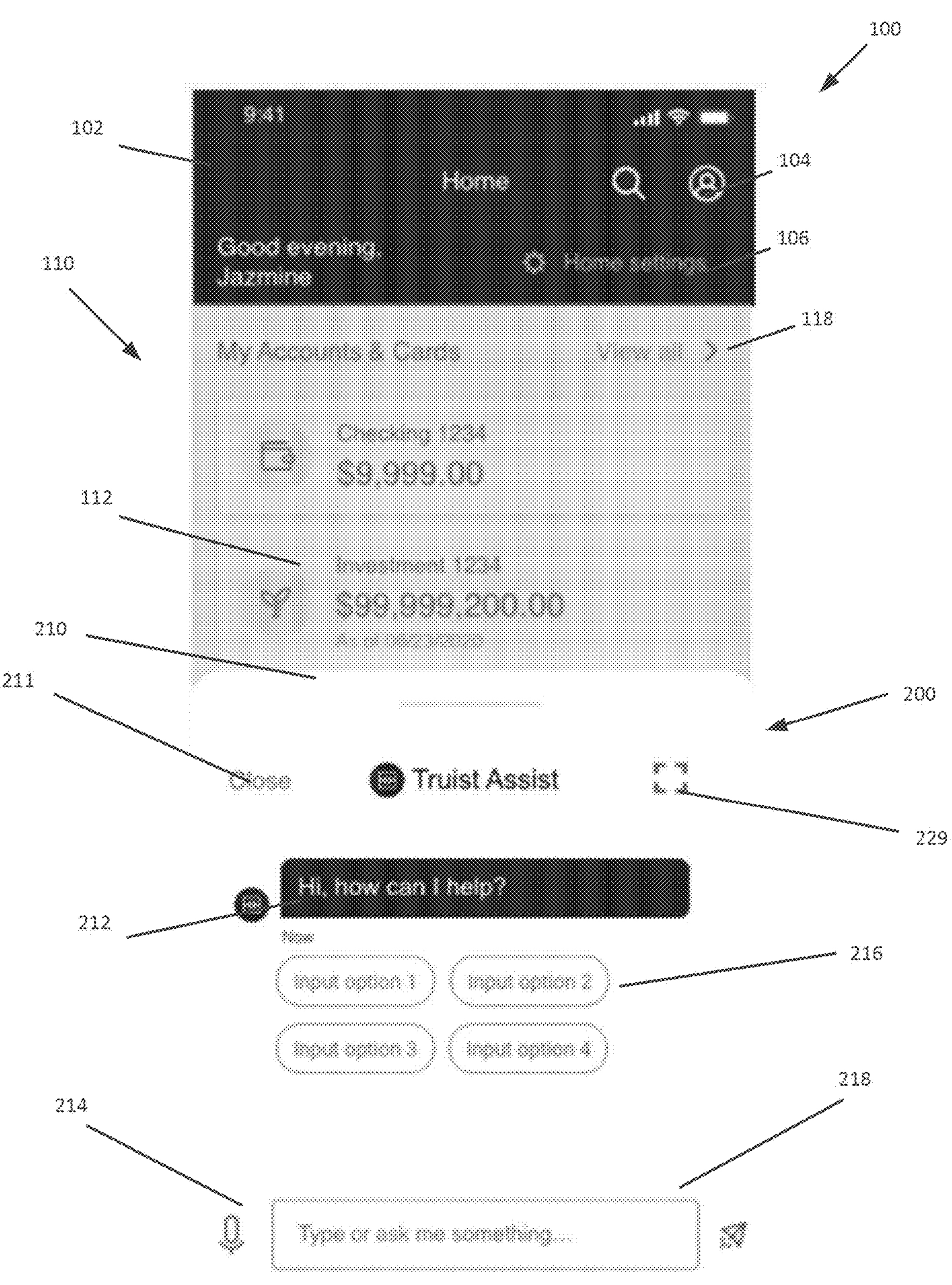
FIG. 2 is a graphical user interface that includes a drawer page overlay for multitasking, according to one example of the present disclosure.

FIG. 2 is a graphical user interface 100 that includes a drawer page 200 overlay for multitasking. The drawer page 200 can include a second set of interactive elements. For example, the drawer page 200 can include a close button 211 that can be selected by the user to enable the user to close the drawer page 200. The drawer page 200 can also include a lock button that can lock the drawer page 200 in place and prevent the user from inadvertently adjusting the position of the drawer page 200. The drawer page 200 can also include a full screen button 229 that can expand the size of the drawer page 200 to fill the graphical user interface 100. Similarly, when expanded to a full screen, a reduce button may be displayed that can reduce the size of the drawer page 200 back to filling only a portion of the graphical user interface 100. The drawer message bubble 212 can include a prompt for a user to select an input option 216. The drawer page can include multiple boxes corresponding to each input option 216 that can be selected by the user. The drawer page 200 can also include a message box 214 to enable the user to input strings of text that the virtual assistant can receive as input. For example, the user can interact with the message box to display a keyboard with which the user can type a message. The user can send the text to the virtual assistant or a live agent by clicking a send button 218. In additional examples, a user can interact with the virtual assistant to issue a command to turn on a microphone to record speech from the user as input. For example, the computing device displaying the drawer page 200 can include audio processing software that can convert the recorded speech into a message from the user.

The drawer page 200 can be sized to cover a portion of the static page 110, while leaving another portion of the static page 110 visible to the user. The drawer page 200 can include a drawer bar 210. The user can select the drawer bar 200 to adjust a position of the drawer bar 210. Adjusting the position of the drawer bar 210 can cause the relative sizes of the drawer page 200 and the static page 110 to change. For example, the user can translate the drawer bar 210 in a first direction to increase the size of the drawer page 200 and decrease the size of the static page 110. Conversely, the user can translate the drawer bar 210 in a second direction to decrease the size of the drawer page 200 and increase the size of the static page 110. Adjusting the drawer page 200 can enable the user to view and interact with desired portions of the graphical user interface simultaneously. For example, while in the middle of a transfer flow using the virtual assistant displayed in the drawer page 210, a user may interact with the account box 112 to view an account number without losing the user's place with the virtual assistant, which is maintained in the drawer page 210. In some examples, the user can select the drawer bar 200 to hide the drawer page 200. For example, the user can tap-and-hold the drawer bar 200 to hide the drawer page 200 to see what is on the static page 110 behind the drawer page 200.

The virtual assistant can receive the message from the user and generate an output based on the message. In some examples, the virtual assistant can include a machine learning algorithm for generating responses to the user input. The virtual assistant can also include natural language processing software for interpreting input from the user. In some examples, the virtual assistant can enable the user to engage in correspondence with a live agent. For example, the virtual assistant can introduce the live agent in response to certain user inputs. In some examples, the virtual assistant can include an option to resume a previous conversation.

Enabling the user to view the static page 110 and the drawer page 200 can enable the user to multi-task. For example, while engaging in correspondence with the virtual assistant or live agent, the user can view account data and access account functions associated with the interactive elements on the static page 110. Enabling the user to multi-task can reduce a consumption of computing resources associated with executing the graphical user interface and can decrease an amount of time spent using the graphical user interface. Enabling the user to multitask can also minimize an amount of network traffic that would otherwise be associated with transferring the user back-and-forth between various pages.

A computing device, such as a server, can acquire historical data associated with adjustments made to the position of the drawer bar 210. For example, upon population of the drawer page 200, the user may habitually adjust the position of the drawer bar 210 to a preferred position before using other features of the drawer page 200. In some examples, the computing device can adjust a default position of the drawer bar 210 based on the historical data. Additionally, the computing device may receive information about a interactions of a large population of users with the drawer bar 210 to generate an updated default position. For example, while particular user interactions may establish a default position of the drawer bar 210 for the particular user, the interactions associated with the large population of users may establish a default position for new users.

Further, the default position of the drawer bar 210 may be influenced by the type of device on which the static page 110 and the drawer page 200 are displayed. For example, it may be beneficial for a smaller device, such as a smartphone, to have a larger area devoted to the drawer page 200 to ensure that the correspondence with the virtual assistant is visual. In such an example, the drawer bar 210 may be set such that the drawer page 200 covers a large portion of the static page 110. In an example where the static page 110 and the drawer page 200 are displayed on a larger device, such as a tablet or a personal computer, it may be beneficial for a smaller proportion of a display screen to be covered by the drawer page 200. In such an example, the drawer bar 210 may be set such that the drawer page 200 covers a smaller portion of the static page 110.

Figure 3:
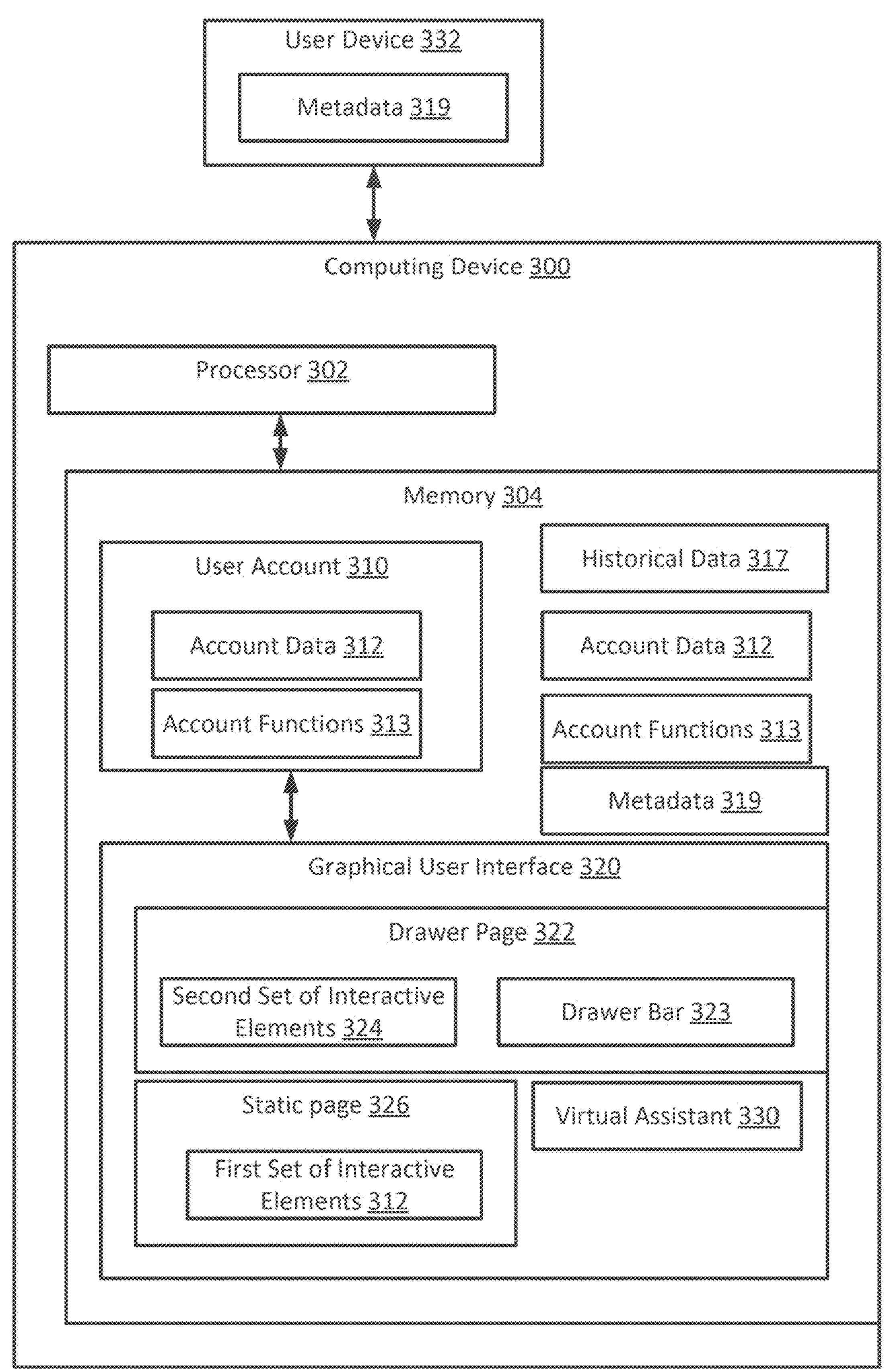
FIG. 3 is a schematic of a computing environment that can generate and display a graphical user interface that includes a drawer page overlay for multitasking, according to one example of the present disclosure.

FIG. 3 is a schematic of a computing environment that can generate and display a graphical user interface that includes a drawer page overlay for multitasking. The computing environment can include a computing device 300 that can be coupled to a user device 320. The computing device 300 can be the same as or different from the user device 320, and can include a server, such as a cloud computing server. The computing device 300 can be coupled to the user device 320 over a network, such as the Internet. Additionally or alternatively, the computing device 300 can be coupled to the user device 320 via a physical connection or local area network. The computing device 300 can include a memory 304 that can be a non-transitory computer-readable medium. The memory 304 can store instructions that can be executed by a processor in the computing device 300. The computing device 300 can include a processor 302 that can be communicatively coupled to a memory 304. The memory 304 can include instructions that can be executable by the processor 302 for causing the processor 302 to perform operations.

The processor 302 can include one processor or multiple processors. Non-limiting examples of the processor 302 include a Field-Programmable Gate Array (FPGA), an application-specific integrated circuit (ASIC), a microprocessor, etc. The processor 302 can execute instructions stored in the memory 304 to perform one or more operations. In some examples, the instructions can include processor-specific instructions generated by a compiler or an interpreter from code written in any suitable computer-programming language, such as C, C++, C#, etc.

For example, the processor 302 can generate a graphical user interface 320. In some examples, the processor 302 can generate the graphical user interface 320 according to account data 312 and account functions 313 associated with a user account 310. The graphical user interface 320 can include a static page 326 and a drawer page 322. In some examples, the graphical user interface 320 may only display the static page 326. The static page 326 can include a first set of interactive elements 312. The user can interact with the first set of interactive elements 312 to access account data 312 or account functions 313 associated with the user account. The first set of interactive elements 312 can include buttons, boxes, slides, or any other suitable interactive UI elements. The user can also interact with the first set of interactive elements 312 to instantiate the drawer page 322. Once instantiated, the drawer page 322 can be overlaid to cover a portion of the static page 326. The drawer page can include a second set of interactive elements 324. The user can interact with the second set of interactive elements 324 to interface with a virtual assistant 330.

The drawer page 322 can include a drawer bar 323. The drawer bar 323 can constitute a boundary between the drawer page 322 and the static page 326. The user can select the drawer bar 323 to adjust the position of the drawer bar 323, thereby adjusting a size of the drawer page 322 and a size of the static page 326. The user may habitually adjust the position of the drawer bar 323 to a preferred position.

In some examples, the processor 302 can obtain historical data 317 associated with adjustments made to the position of the drawer bar 323. Based on the historical data 317, the processor 302 can adjust a default position of the drawer bar 323. In some examples, the historical data 317 can correspond to adjustments made to the drawer bar 323 by a group of multiple users. In some examples, the processor 302 can adjust the default position of the drawer bar 323 based on a statistical parameter associated with the historical data 317. For example, the processor can calculate an average position of the drawer bar 323 and adjust the default position of the drawer bar 323 based on the average position of the drawer bar 323. The processor 302 can also obtain metadata 319 associated with a user device 332. The metadata 319 can include a device type corresponding to the user device 332. The processor 302 can further adjust the default position of the drawer bar 323 based on the metadata 319. For example, processor 302 can adjust the default position of the drawer bar 323 based on the detected device type corresponding to the user device.

Figure 4:
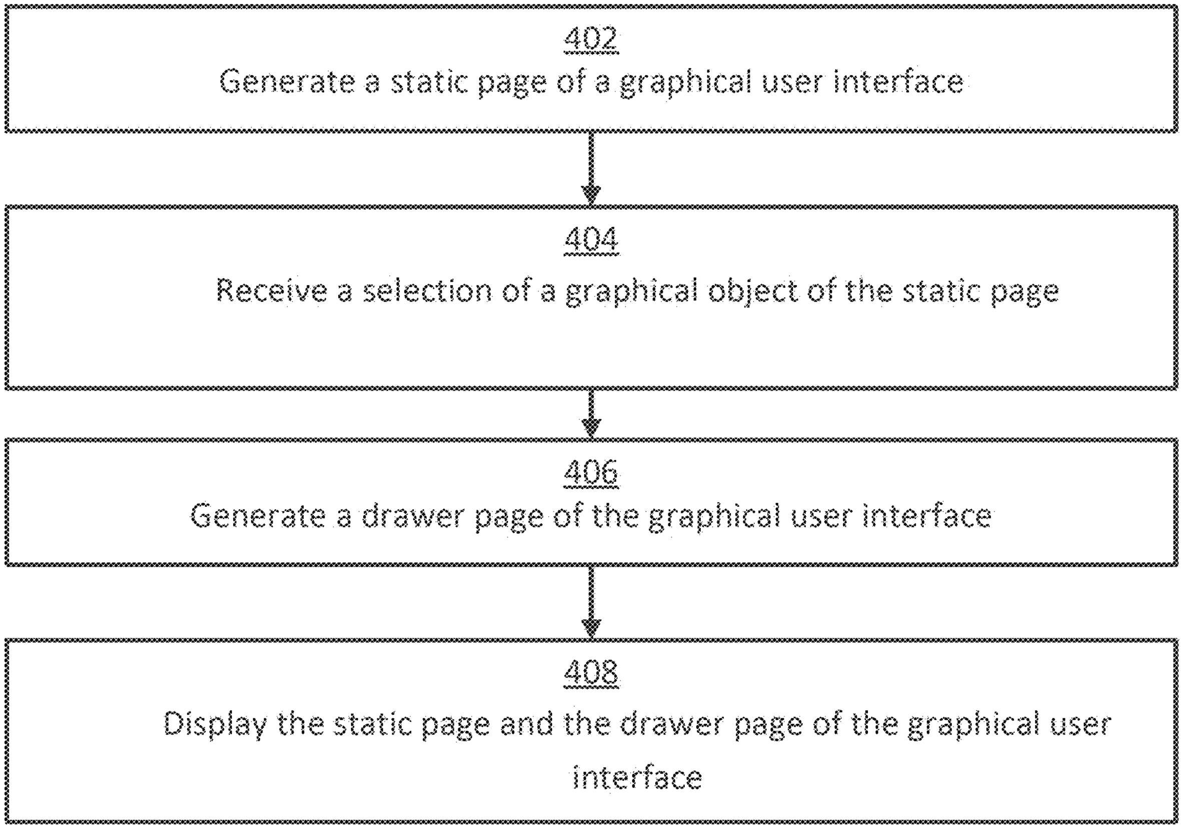
FIG. 4 is a flow chart of a process by which a computing device can generate a graphical user interface that includes a drawer page overlay for multitasking, according to one example of the present disclosure.

FIG. 4 is a flow chart of a process 400 by which a computing device can generate a graphical user interface that includes a drawer page overlay for multitasking.

At block 402, the computing device can generate the static page 110 of a graphical user interface. The static page 110 can include a graphical object 120 that can be interacted with by user of the graphical user interface. The graphical object 120 can be displayed as 'hovering' over elements of the static page 110. For example, the user may be able to scroll through the static page 110 without adjusting the relative position of the graphical object 120. The graphical object 120 can be, for example, a shape with a logo or icon inscribed within it.

At block 404, the computing device can receive a selection of the graphical object 120 of the static page 110 by the user. In an example, the user may tap or otherwise select the graphical object 120 to perform a selection. In some examples, the selection of the graphical object 120 may be a general interaction with a display of the computing device. For example, the user may swipe a screen of the computing device to perform the selection of the graphical object 120.

At block 406, the computing device can generate a drawer page 200 of the graphical user interface. In an example, the drawer page 200 can be overlaid on the static page 110 once displayed. The drawer bar 210 can function as a boundary between the static page 110 and drawer page 200. A user can select the drawer bar 210 to adjust the size of the static page 110 and the size of the drawer page 200. The user can select a portion of the drawer bar 210 to hide the drawer page 200. In an example, the user may habitually adjust the position of the drawer bar 210 if the static page 200 and the drawer page 110 are not at their desired sizes. The computing device can detect adjustments to the position of the drawer bar 210 and position the drawer bar 210 at a default position based on the adjustments of the drawer bar 210 when the drawer page 200 is generated.

At block 408, the computing device can display the static page 110 and the drawer page 200 of the graphical user interface. In some examples, the computing device can adjust the default position of the drawer bar 210 based on the adjustments made to the position of the drawer bar 210 by multiple users. For example, the historical data can include position data associated with drawer bars 210 corresponding to multiple users. The computing device can also detect metadata associated with a user device corresponding to the user. The metadata can include a device type corresponding to the user device. The computing device can adjust the default position of the drawer bar 210 according to the metadata. For example, if the user device is a certain type of mobile device, the computing device can adjust the default position of the drawer bar accordingly.

The foregoing description of certain examples, including illustrated examples, has been presented only for the purpose of illustration and description and is not intended to be exhaustive or to limit the disclosure to the precise forms disclosed. Numerous modifications, adaptations, and uses thereof will be apparent to those skilled in the art without departing from the scope of the disclosure. For instance, any examples described herein can be combined with any other examples to yield further examples.

Although the subject matter has been described in language specific to structural features or methodological acts, it is to be understood that the subject matter defined in the appended claims is not necessarily limited to the specific features or acts described above. Rather, the specific features and acts described above are disclosed as example forms of implementing the claims.

What is claimed is:

1. A system comprising:

a processor; and a memory comprising program code that is executable by the processor for causing the processor to:

generate a static page of a graphical user interface;

receive a selection of a graphical object by a user at the graphical user interface to display a drawer page;

generate the drawer page of the graphical user interface, the drawer page overlaid on at least a portion of the static page and comprising a drawer bar that is interactable by the user to adjust a drawer page size of the drawer page and a static page size of the static page based on a position of the drawer bar; and display the static page and the drawer page of the graphical user interface, the drawer bar positioned at a default position based on historical data associated with the drawer bar, wherein the historical data associated with the drawer bar comprises data associated with user adjustments made by a plurality of users to a plurality of drawer bar positions using devices that are a device type that matches the device type associated with the user.

2. The system of claim 1, wherein the static page comprises a first set of interactive elements comprising:

a plurality of resource shortcuts;

a plurality of account boxes; and the graphical object selectable by the user to display the drawer page.

3. The system of claim 1, further comprising program code that is executable by the processor for causing the processor to:

detect metadata corresponding to hardware that is associated with a user device; and based on the metadata, adjust the default position of the drawer bar.

4. The system of claim 1, wherein the drawer page comprises a second set of interactive elements comprising a message box configured to receive user input, and at least one message bubble configured to display an output to the user.

5. The system of claim 4, wherein the second set of interactive elements is configured to provide the user input to a virtual assistant that is configured to generate the output based on the user input to engage in correspondence with the user.

6. The system of claim 5, wherein the user input comprises an audio input.

7. The system of claim 5, wherein the virtual assistant is configured to, in response to a certain user input, connect the user with a live agent.

8. The system of claim 1, wherein a portion of the drawer bar is selectable by the user to hide the drawer page.

9. A computer-implemented method comprising:

generating a static page of a graphical user interface;

receiving a selection of a graphical object by a user at the graphical user interface to display a drawer page;

generating a drawer page of the graphical user interface, the drawer page overlaid on at least a portion of the static page and comprising:

a drawer bar that is interactable by the user to adjust a drawer page size of the drawer page and a static page size of the static page based on a position of the drawer bar; and displaying the static page and the drawer page of the graphical user interface, the drawer bar positioned at a default position based on historical data associated with the drawer bar, wherein the historical data associated with the drawer bar comprises data associated with user adjustments made by a plurality of users to a plurality of drawer bar positions using devices that are a device type that matches the device type associated with the user.

10. The computer-implemented method of claim 9, wherein the drawer page comprises a second set of interactive elements comprising a message box configured to receive user input, and at least one message bubble configured to display an output to the user.

11. The computer-implemented method of claim 10, wherein the second set of interactive elements is configured to provide the user input to a virtual assistant that is configured to generate the output based on the user input to engage in correspondence with the user.

12. The computer-implemented method of claim 11, wherein the user input comprises an audio input.

13. The computer-implemented method of claim 11, wherein the virtual assistant is configured to, in response to a certain user input, connect the user with a live agent.

14. The computer-implemented method of claim 9, wherein a portion of the drawer bar is selectable by the user to hide the drawer page.

15. A non-transitory computer-readable medium comprising program code that is executable by a processor for causing the processor to:

generate a static page of a graphical user interface;

receive a selection of a graphical object by a user at the graphical user interface to display a drawer page;

generate the drawer page of the graphical user interface, the drawer page overlaid on at least a portion of the static page and comprising:

a drawer bar that is interactable by the user to adjust a drawer page size of the drawer page and a static page size of the static page based on a position of the drawer bar; and display the static page and the drawer page of the graphical user interface, the drawer bar positioned at a default position based on historical data associated with the drawer bar, wherein the historical data associated with the drawer bar comprises data associated with user adjustments made by a plurality of users to a plurality of drawer bar positions using devices that are a device type that matches the device type associated with the user.

16. The non-transitory computer-readable medium of claim 15, wherein the drawer page comprises a second set of interactive elements comprising a message box configured to receive user input, and at least one message bubble configured to display an output to the user.

17. The non-transitory computer-readable medium of claim 16, wherein the second set of interactive elements is configured to provide the user input to a virtual assistant that is configured to generate the output based on the user input to engage in correspondence with the user.

18. The non-transitory computer-readable medium of claim 16, wherein the user input comprises an audio input.

19. The non-transitory computer-readable medium of claim 17, wherein the virtual assistant is configured to, in response to a certain user input, connect the user with a live agent.

20. The non-transitory computer-readable medium of claim 15, further comprising program code that is executable by the processor for causing the processor to:

detect metadata corresponding to hardware that is associated with a user device; and based on the metadata, adjust the default position of the drawer bar.

* * * * *